US007917860B2

(12) United States Patent
Gossman

(10) Patent No.: US 7,917,860 B2
(45) Date of Patent: Mar. 29, 2011

(54) SIMPLE STYLING

(75) Inventor: John Gossman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/071,766

(22) Filed: Mar. 3, 2005

(65) Prior Publication Data
US 2006/0197779 A1 Sep. 7, 2006

(51) Int. Cl.
G06F 3/048 (2006.01)
G06F 3/00 (2006.01)
(52) U.S. Cl. .................. 715/765; 715/760; 715/746
(58) Field of Classification Search .................. 715/765, 715/746, 672
See application file for complete search history.

(56) References Cited

U.S. PATENT DOCUMENTS

| 5,600,778 | A | * | 2/1997 | Swanson et al. | 715/762 |
| 5,905,492 | A | * | 5/1999 | Straub et al. | 715/744 |
| 6,104,391 | A | * | 8/2000 | Johnston et al. | 715/745 |
| 6,188,399 | B1 | * | 2/2001 | Voas et al. | 715/723 |
| 6,590,590 | B1 | * | 7/2003 | Wen et al. | 715/764 |
| 6,664,981 | B2 | * | 12/2003 | Ashe et al. | 715/765 |
| 6,690,356 | B2 | * | 2/2004 | Johnston et al. | 345/157 |
| 6,710,782 | B2 | * | 3/2004 | Ruff et al. | 345/619 |
| 6,731,310 | B2 | * | 5/2004 | Craycroft et al. | 715/765 |
| 6,791,581 | B2 | * | 9/2004 | Novak et al. | 715/744 |
| 7,028,262 | B2 | * | 4/2006 | Estrada et al. | 715/751 |
| 7,073,130 | B2 | * | 7/2006 | Novak et al. | 715/744 |
| 7,143,344 | B2 | * | 11/2006 | Parker et al. | 715/236 |
| 7,320,109 | B1 | * | 1/2008 | Zeevi et al. | 715/763 |
| 7,458,020 | B2 | * | 11/2008 | Novak et al. | 715/234 |
| 2001/0045961 | A1 | | 11/2001 | Stoakley et al. | 345/744 |
| 2002/0024539 | A1 | * | 2/2002 | Eleftheriadis et al. | 345/765 |
| 2002/0101444 | A1 | * | 8/2002 | Novak et al. | 345/744 |
| 2002/0147748 | A1 | * | 10/2002 | Huang et al. | 707/517 |
| 2004/0196293 | A1 | | 10/2004 | Fernandez et al. | 345/581 |
| 2004/0210825 | A1 | * | 10/2004 | Novak et al. | 715/500.1 |

FOREIGN PATENT DOCUMENTS

| CN | 1564976 A | 1/2005 |
| EP | 1 156 416 A2 | 11/2001 |
| WO | WO 98/21642 | 5/1998 |
| WO | WO 03/032151 A2 | 4/2003 |

* cited by examiner

Primary Examiner — William L Bashore
Assistant Examiner — David Phantana-angkool
(74) Attorney, Agent, or Firm — Woodcock Washburn LLP

(57) ABSTRACT

A style model implementation that is applied to objects within a user interface to define any attributes of the objects. The model is divided into two parts: a "runtime" which uses a style definition to affect the look and feel of the user interface, and a "design-time" which is the experience presented by WYSIWYG tools used to define the look and feel of the user interface. The design-time may be implemented in terms of the run-time objects. Properties associated with the styles can be set on the objects using the design-time UI and enforced at runtime. Styles may be grouped into themes to provide an easy mechanism to apply changes to many objects.

12 Claims, 3 Drawing Sheets

SIMPLE STYLING

FIELD OF THE INVENTION

This invention relates in general to the field of graphics editing. More particularly, this invention relates to a system and method of providing a style mechanism that is used to apply attributes to graphical and other types of objects within a computing environment.

BACKGROUND OF THE INVENTION t A style, as understood by one of ordinary skill in the art, is the manner in which written material is presented, usually in a particular publication or by a particular publisher. Styles are used in, for example, MICROSOFT WORD and MICROSOFT VISIO to define the way in which text, lines and/or fill is presented. The style definitions enforce certain characteristics of the text, lines and/or fill in order to provide a uniform appearance throughout a document.

One area where styles have not been implemented in a general sense in user interface (UI) design, where it would be desirable to define, enforce and maintain definitions of the UI design at both design time and runtime. There have been attempts at this goal, such as CSS (Cascading Style Sheets) and XSL (Extensible Style Language) which are used in web page design. However, both of these methods are notoriously complex and hard to understand. More importantly it has proven very difficult to write software tools that utilize them efficiently, particularly WYSIWYG (What You See Is What You Get) tools that allow direct manipulation and understanding of the design.

One problem is how software design time tools can define UI styles, while runtime software enforces these rules and allows them to change without breaking the functionality of the interface. Specifically, a styling mechanism should be: general and applicable to all aspects of UI design, able to manipulate through graphics and development tools, and simple and familiar so that UI designers can easily master it. However, no conventional style mechanism provides these features.

Accordingly, there is a need for a styling mechanism that provides the functionalities noted above. The present invention provides such a solution.

SUMMARY OF THE INVENTION

The present invention is directed to methods for implementing a style model that is applied to objects within a user interface to define any attributes of the objects. The model is divided into two parts: a "runtime" which uses a style definition to affect the look and feel of the user interface, and a "design-time" which is the experience presented by WYSIWYG tools used to define the look and feel of the user interface. The design-time may be implemented in terms of the run-time objects. Properties associated with the styles can be set on the objects using the design-time UI and enforced at runtime. Styles may be grouped into themes to provide an easy mechanism to apply changes to many objects.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
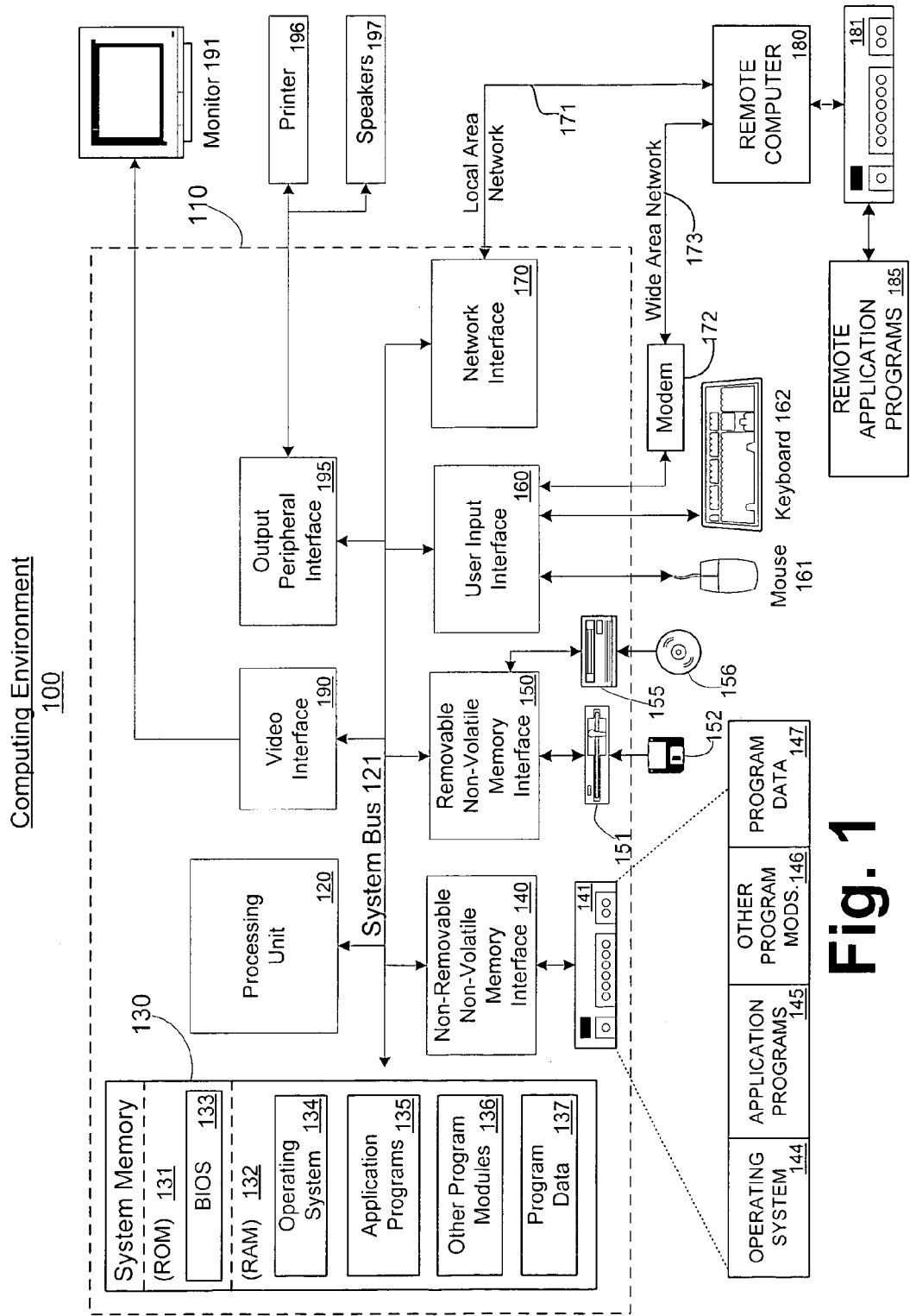
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of Styling for UI Design

A modern user interface (UI) is typically defined by a set of objects representing elements within the UI (e.g., buttons, rectangles, windows) and the properties of those elements (e.g., color, position, text values). The present invention implements a "style" as a set of properties, including but not limited to color, position, geometry, etc., and an assignment of values to those properties, e.g., green, middle of the screen, oval, etc. Each style may have a name or other identifier that can be used to uniquely refer to it, and styles can be applied to objects in the UI definition. For example, a user interface designer could define two styles, one called "Zebra" in which foreground and background color are defined as black and white and another called "Tiger" in which foreground and background color are defined as black and orange. If "Zebra"

is applied to a set of buttons and listboxes, they would appear in black and white, or the designer could apply "Tiger" to get a black and orange scheme.

The style definition mechanism of the present invention may be divided into two parts: a "runtime" component which uses the style definition to affect the look and feel of the UI, and a "design-time" component which is the experience presented by the WYSIWYG tools used to define the look and feel of the user interface. The design-time component can be implemented in terms of the runtime objects.

Runtime Style Objects

A style object is a named set of properties with value assignments. The properties may come from any class. A general mechanism for referring to properties is used such that a Common Language Runtime (CLR) and other object systems can refer to a property by giving the name of the Type and the name of the Property. For example "Button.Background" where "Button" is the name of a Type and "Background" is the name of a property of that type. The CLR is part of the NET Framework available from MICROSOFT CORP. and manages the execution of programs and provides for sharing of common object-oriented classes.

Given this, it is possible to declare a Style in XML, for example:

```
<Style Name="MyStyle" Button.Background="RGB(0,0,1,0)"
    DockPanel.Dock="Left"/>
```

If style-inheritance is implemented, a style may be based on another style. This means a style may pick up any property and/or value pairs from a parent style. Property assignments in the new style take precedence and are said to "override" the parent settings. For example:

```
<Style Name="BaseStyle" Button.Background="RGB(0,0,1,0)"
    Button.Foreground="RGB(0,1,0,0)"/>
<Style Name="DerivedStyle" BasedOn="BaseStyle"
    Button.Background="RGB(0,1,1,0)"
    Button.BorderColor="RGB(0,1,1,1)"/>
```

A pseudo-C# class definition of a style may be as follows:

```
class Style
{
    public string Name { get; set; }
    public Dictionary<Property, object> Properties { get; }
    public Style BasedOn { get; set; }
}
```

Every element includes a property called style, whose value is the ID of a style. The value of this property is the style of the element.

<Button Style="ButtonStyle" . . . />

Named and shared resources can be defined of any property type.

```
<def:Resource Name="Blue" Value="RGB(0,0,0,1)"/>
<def:Resource Name="SystemForeground"
    Value="RGB(0,0,1,1)"/>
```

-continued

```
<Style Name="Foo" Background="%Blue"
    Foreground="%SystemForeground"/>
```

The value of any stylable property is determined by checking if there is a local value on an element. If none exists, the property value is used from the element's style.

Styles and resources may be organized into themes. A theme is a group of style definitions that makes it easy to switch the overall look of a set of content.

```
<Theme>
    <def:Resource Name="Blue" Value="RGB(0,0,0,1)"/>
    <def:Resource Name="SystemForeground"
Value="RGB(0,0,1,1)"/>
    <Style Name="BaseButtonStyle" . . . />
    <Style Name="SpinButtonStyle"
BasedOn="BaseButtonStyle" . . . />
    . . .
</Theme>
```

A local theme can override existing styles or extend the set of styles. Thus, a user may choose to change the default button background for all buttons in an application without the need to change the style property of all those buttons. In addition, it is preferable that all controls specify a default style property that is one of the well-known style names. For example, the button class may define its default style as "SystemButtonStyle".

In accordance with the present invention, several variations of the above are possible. According to a first variation, arbitrarily scoped themes may be defined. Here, a theme can be introduced at any level in the structure of the tree. Thus, a theme may override styles and introduce new styles inside a panel or inside a button, etc. A second variation defines styles and templates as the same thing. If templates may also set properties on the control they are attached, then styles as defined here are merely a subset of templates. A third variation is strongly typed styles. Styles may fall into sets of related properties (similar to QueryGroups). These related properties may be all the text properties, stroke properties etc. Control will have separate properties for each type of style under this variation. This is very flexible and imposes a useful organization on styles.

At runtime, styles may be applied to objects having the objects provide a list of styles, using the style names to identify them. For example:

<Button Style="MyStyle; OtherStyle"/>

The actual values of properties on the object are determined by a precedence calculation. First, any properties set directly on the object are applied, then the list of styles is walked in order and any properties not already set are applied from the current style. Thus, in the above examples any properties in MyStyle that were not directly set on the Button would be applied, then any properties of OtherStyle that were not set directly on the button or set by MyStyle would be applied.

In general, given object O with list of styles {s1, s2, s3, . . . Sn}, the final property values would be applied in this order:

Any properties set on O
Any properties set on s1, not set on O
Any properties set on s2, not set on O or s1
. . .
Any properties set on sn, not set on O, s1, s2, . . . sn−1

Figure 2:
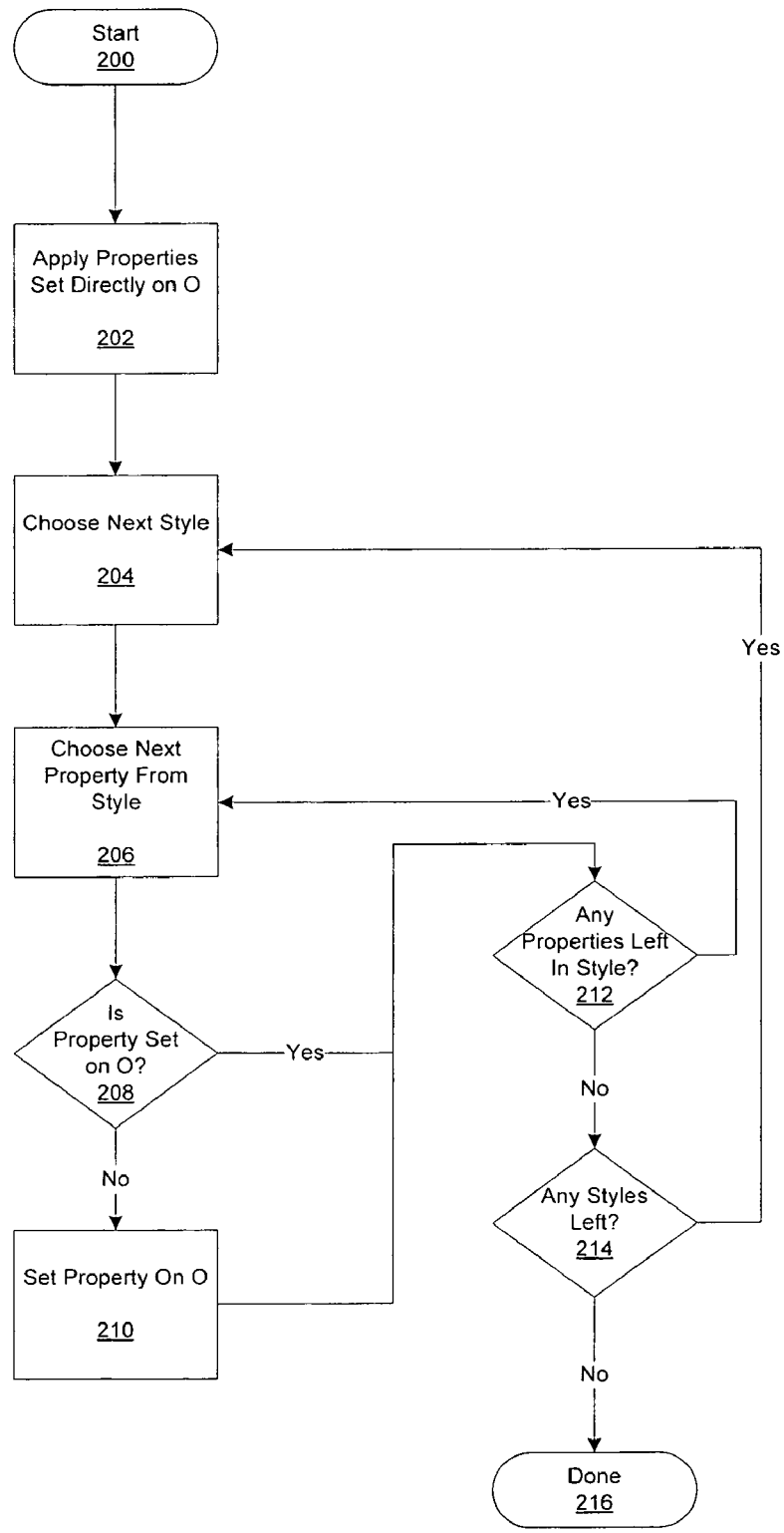
FIG. 2 is a flow chart of the processes performed by a runtime component in accordance with the present invention.

Referring now to FIG. 2, there is a flow chart of the processes performed by the runtime component of the present invention. The process begins for each object ("O") at step 200. At step 202, style properties set on O are applied. The next style is then selected at step 204. At step 206, the next property associated with the style is applied from the style. At step 208, it is determined if the property is set on O. If not, then the property is set at step 210, otherwise, the process continues at step 212 to determine if there are any remaining properties in the style. If so, then processing returns to step 206, otherwise processing continues at step 214, where it is determined if there any styles left to be applied. If so, then processing returns to step 204, otherwise, processing exits at step 216.

Figure 3:
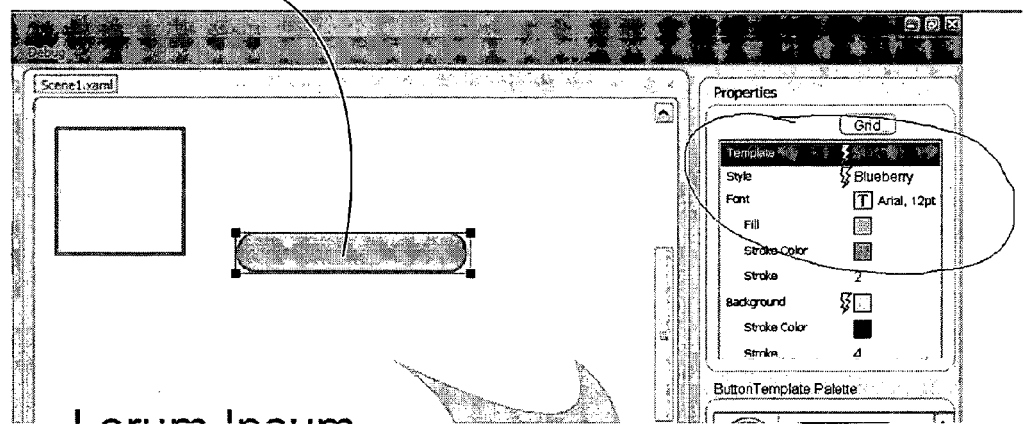
FIGS. 3 and 4 are exemplary design-time user interfaces.
Figure 4:
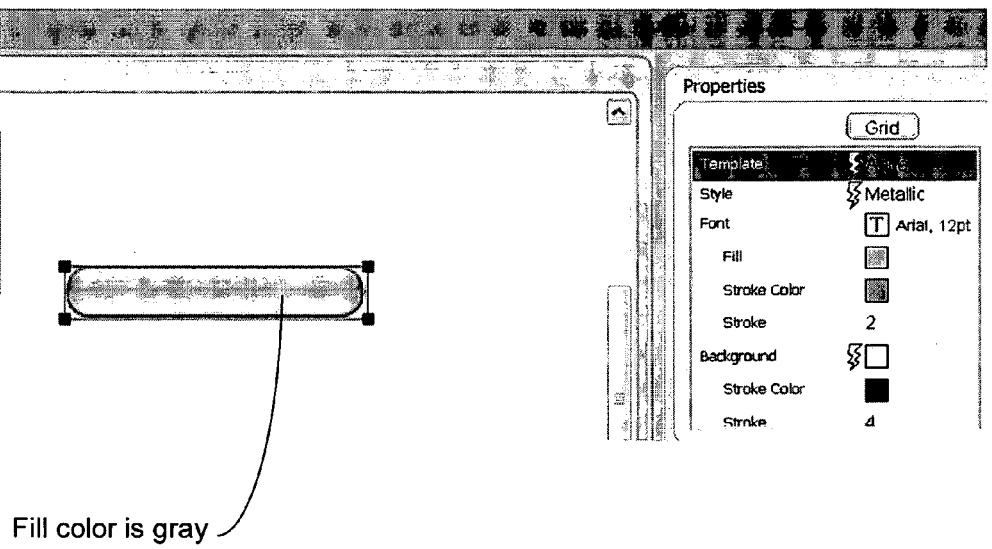

In accordance with the present invention, a set of user interface tools may display a list of styles by name, and allow the designer to assign properties and values into the properties they represent. Further, tools provide for the of styles to elements of the UI. An exemplary design of such a UI is shown in FIGS. 3 and 4. A runtime component causes the UI elements to pick up the property assignments, and allows the elements to pick up new property assignments by changing the definition or application of styles. Extensions to the present invention may allow multiple styles to be applied to a single object, so that a color style and a font style can be mixed together, and style inheritance, which adopts the Object Oriented concept of class inheritance to allow easier management and reuse of styles.

Referring to FIGS. 3 and 4, styles may be defined using the exemplary dialog boxes shown therein. The UI allows properties to be set on a object directly. Using the UI, an object may be selected and the properties extracted from it. The extracted properties can then be named as a style. A style may be applied by pointing to an object and setting the style by name. As shown in FIG. 3, the selected button is picking up its color properties from the "Blueberry" style. Simply changing the style to Metallic will change a whole set of properties, as shown in FIG. 4.

Thus, the present invention provides a simple, toolable mechanism that is compatible with the resource model. Because it may be implemented with XML, it can be serialzed as well as easily debugged. While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of applying styles to an object within a user interface during runtime, comprising:
   during runtime, ascertaining a first style and a second style associated with said object, wherein said object, said first style, and said second style are described in a high-level language, the high-level language description of the first style having been determined through operations comprising:
      displaying a graphical design interface, the graphical design interface comprising a graphical design element, the graphical design interface accepting input corresponding to defining a user interface, the user interface corresponding to a program;
      receiving input at the graphical design interface, the input corresponding to interaction with a graphical element of the graphical design interface;
      determining the first style corresponding to the input, the first style comprising a named set of at least one property and a corresponding value assignment, the first style corresponding to a selected object of the user interface displayed by the graphical design interface; and
      storing the style in the high-level language format;
   assigning a first property of the first style and the corresponding value assignment to the object, a property comprising a graphical attribute of the object in the user interface;
   assigning a second property of the first style and the corresponding value assignment to the object;
   determining that a third property of the second style and the corresponding value assignment is not to be assigned to the object because the third property is overridden by the first property;
   assigning a fourth property of the second style and the corresponding value assignment to the object because the fourth property is not overridden by a property of the first style; and
   displaying the object in the user interface with the first property's value assignment, the second property's value assignment, and the fourth property's value assignment.

2. The method of claim 1, further comprising applying local properties on said object.

3. The method of claim 1, further comprising organizing said styles into themes.

4. The method of claim 3, further comprising overriding said styles by applying a local theme.

5. The method of claim 3, wherein the memory further bears processor-executable instructions that, when executed on the processor, cause the processor to perform operations comprising:
   overriding said styles by applying a local theme.

6. The method of claim 1, wherein the memory further bears processor-executable instructions that, when executed on the processor, cause the processor to perform operations comprising:
   organizing said styles into themes.

7. A computer readable storage medium having stored thereon computer executable instructions for applying styles to a plurality of objects within a user interface of a program during runtime, comprising:
   during runtime, ascertaining a first style associated with a first object and a second object, and a second style associated with the first object and the second object, wherein the first object, the second object, the first style, and the second style are described in a high-level language, the high-level language description of the first style having been determined through operations comprising:
      displaying a graphical design interface, the graphical design interface comprising a graphical design element, the graphical design interface accepting input corresponding to defining a user interface, the user interface corresponding to a program;

receiving input at the graphical design interface, the input comprising interaction with a graphical attribute of a graphical object of the graphical design interface;

determining the first style corresponding to the input, the first style comprising a named set of at least one property and a corresponding value assignment, the first style corresponding to a selected object of the user interface displayed by the graphical design interface; and storing the style in the high-level language format;

assigning a first property of the first style and the corresponding value assignment to the first object, a property comprising a graphical attribute of the object in the user interface;

assigning the first property and the corresponding value assignment to the second object;

assigning a second property of the first style and the corresponding value assignment to the object;

determining that a third property of the second style and the corresponding value assignment is not to be assigned to the object because the third property is overridden by the first property;

assigning a fourth property of the second style and the corresponding value assignment to the object because the fourth property is not overridden by a property of the first style; and displaying the object in the user interface.

8. The computer readable storage medium of claim 7, further comprising instructions for applying local properties on said object.

9. The computer readable storage medium of claim 7, further comprising instructions for organizing said styles into themes.

10. The computer readable storage medium of claim 9, further comprising instructions for overriding said styles by applying a local theme.

11. A system for applying styles to an object within a user interface during runtime, comprising:

a processor; and a memory coupled to the processor, bearing processor-executable instructions, that when executed on the processor, cause the processor to perform operations comprising:

during runtime, ascertaining a first style and a second style associated with said object, wherein said object, said first style, and said second style are described in a high-level language;

assigning a first property of the first style and the corresponding value assignment to the object, a property comprising a graphical attribute of the object in the user interface;

assigning a second property of the first style and the corresponding value assignment to the object;

determining that a third property of the second style and the corresponding value assignment is not to be assigned to the object because the third property is overridden by the first property;

assigning a fourth property of the second style and the corresponding value assignment to the object because the fourth property is not overridden by a property of the first style; and displaying the object in the user interface.

12. The system of claim 11, wherein the memory further bears processor-executable instructions that, when executed on the processor, cause the processor to perform operations comprising:

applying local properties on said object.

* * * * *